United States Patent [19]
Stein et al.
[11] 3,956,351
[45] May 11, 1976

[54] PROCESS FOR SEPARATING FATTY MIXTURES

[75] Inventors: Werner Stein, Erkrath-Unterbach; Richard Schuh, Hannover, both of Germany

[73] Assignee: Henkel & Cie G.m.b.H., Dusseldorf, Germany

[22] Filed: Apr. 30, 1974

[21] Appl. No.: 465,528

[30] Foreign Application Priority Data

May 9, 1973 Austria .............................. 4067/73

[52] U.S. Cl. ................................ 260/419; 260/428
[51] Int. Cl.$^2$ ....................... C09F 5/10; C11B 3/00; C11C 1/08
[58] Field of Search ............................ 260/419, 428

[56] References Cited

UNITED STATES PATENTS

| | | | |
|---|---|---|---|
| 3,052,700 | 9/1962 | Waldman et al. | 260/419 |
| 3,541,122 | 11/1970 | Payne et al. | 260/419 |
| 3,733,343 | 5/1973 | Hartmann et al. | 260/428 |
| 3,737,444 | 6/1973 | Hartmann et al. | 260/419 |

FOREIGN PATENTS OR APPLICATIONS

| | | | |
|---|---|---|---|
| 724,222 | 2/1955 | United Kingdom | 260/419 |

*Primary Examiner*—Winston A. Douglas
*Assistant Examiner*—P. E. Konopka
*Attorney, Agent, or Firm*—Hammond & Littell

[57] ABSTRACT

A method for separating mixtures of fatty substances into components with different melting points in which a fatty substance suspension separated from a liquid fat portion is transformed by heating to temperatures between the melting point of the solid portions and about 85° C by means of the usual separating devices at ordinary or increased gravity into a three-phase system which consists of molten solid particles as the lightest phase, of an intermediate aqueous phase of medium specific gravity rich in wetting agents, and of a heavy aqueous phase which is low in wetting agents, and the solid portions are then separated.

12 Claims, 3 Drawing Figures

PROCESS FOR SEPARATING FATTY MIXTURES

THE PRIOR ART

The separation of fatty acid mixtures or of fatty acid ester mixtures into components of different melting points by a wetting agent process is known from U.S. Pat. No. 2,800,493, July 23, 1957, Stein et al. This process has become known as the "Rewetting or Hydrophilization Process". According to this patent, a mixture of solid and oily fatty substance particles is transformed by means of a wetting agent solution, optionally containing non-surface-active electrolyte, into a dispersion of separate solid and oily fatty substance particles. This dispersion is separated by means of solid jacket centrifuges into an oily phase and an aqueous phase containing the solid fatty substance particles in dispersion. The heat removal necessary for the crystallization of the solid fatty substance particles is obtained by cooling devices, in particular scraping condensers. After termination of the separating process, the recovered wetting agent solution is recycled. German Pat. No. 1,010,062, or U.S. Pat. No. 2,972,636, Feb. 21, 1961, Stein et al., describes a corresponding process for the separation of fatty alcohols.

The essential disadvantages of the above-mentioned processes are the high investment and operating costs for cooling equipment and cooling devices. In particular, the required scraping condensers are costly and require continual servicing. Furthermore, in the presence of impurities in the fatty acid mixture the hydrophilization process encounters some difficulties. Thus, it is generally only possible to work for a long time in continuous operation in the absence of the impurities described below. If less pure fats are used, the separation will be poorer, because of the accumulation of impurities; and the separation will finally be extremely unsatisfactory.

U.S. Pat. Nos. 3,737,444, June 5, 1973, Hartmann et al. and 3,733,343, May 15, 1973, Hartmann et al., describe a process for the separation of a portion of the circulating wetting agent solution during the separation of fatty acid mixtures or fatty acid ester mixtures into components with different melting points by means of the hydrophilization process, and to replace it by fresh aqueous wetting agent solution. This method is of particular importance in the processing of fatty acid mixtures which contain 0.8% to 15% by weight, preferably 1% to 10% by weight, of non-fatty acid organic accompanying substances. The term "non-fatty acid organic substances" (abbreviated "NF") is understood to mean the raw material used for the production of the fatty acid mixture which originate from the production itself or from the processing of the fatty acid mixtures to be separated. The material of the NF does not have formula R—COOH, wherein R is straight chain or branched chain aliphatic, optionally cycloaliphatic, saturated or unsaturated hydrocarbon radical containing 7 to 27 carbon atoms, preferably 9 to 21 carbon atoms. These NF ingredients are found primarily in undistilled cracked fatty acids.

Included within the above definition of NF are other substances contained in natural fats which yield no fatty acids when these natural fats are hydrolyzed, but remain in the fatty acid mixtures. In fatty acid mixtures of synthetic origin NF material also includes substances accompanying the starting material for the production of these fatty acids, such as paraffins, olefins, alcohols, aldehydes, etc., which remain partly or completely in the end products, if necessary, after the crude fatty acids have been processed.

The removal of the wetting agent solution improves the separating effect not only in fatty acid mixtures, but also in other fatty mixtures.

Unfortunately the removal of the wetting agent solution results necessarily in undesired losses of wetting agents. The problem was therefore to find a way to reduce these losses.

Another problem was to find a method where the content of wetting agent in the solid fat portions is less than heretofore.

OBJECTS OF THE INVENTION

It is an object of the present invention to provide a method in which a suspension of fatty material separated from a liquid fat portion is transformed by heating to temperatures between the melting point of the solid portions and about 85° C by means of the usual separating devices at ordinary or increased gravity, into a three-phase system which consists of molten solid particles as the lightest phase; of an intermediate aqueous phase of medium specific gravity rich in wetting agents, and of a heavy aqueous phase which is low in wetting agents; and the solid portions are then separated.

It is another object of the present invention to provide a process for the separation of mixtures of fatty substances by the hydrophilization process, wherein the solid substance suspension in an aqueous wetting agent solution is transformed into a three-phase system by heating said suspension to a temperature above the melting point of the fatty substances and up to 85° C, and separating said fatty substances from the three-phase system.

These and further objects of the present invention will become apparent as the description thereof proceeds.

THE DRAWINGS

The following drawings are merely illustrative of the present invention without being deemed limitative in any manner thereof, as follows.

DESCRIPTION OF THE INVENTION

Figure 1:
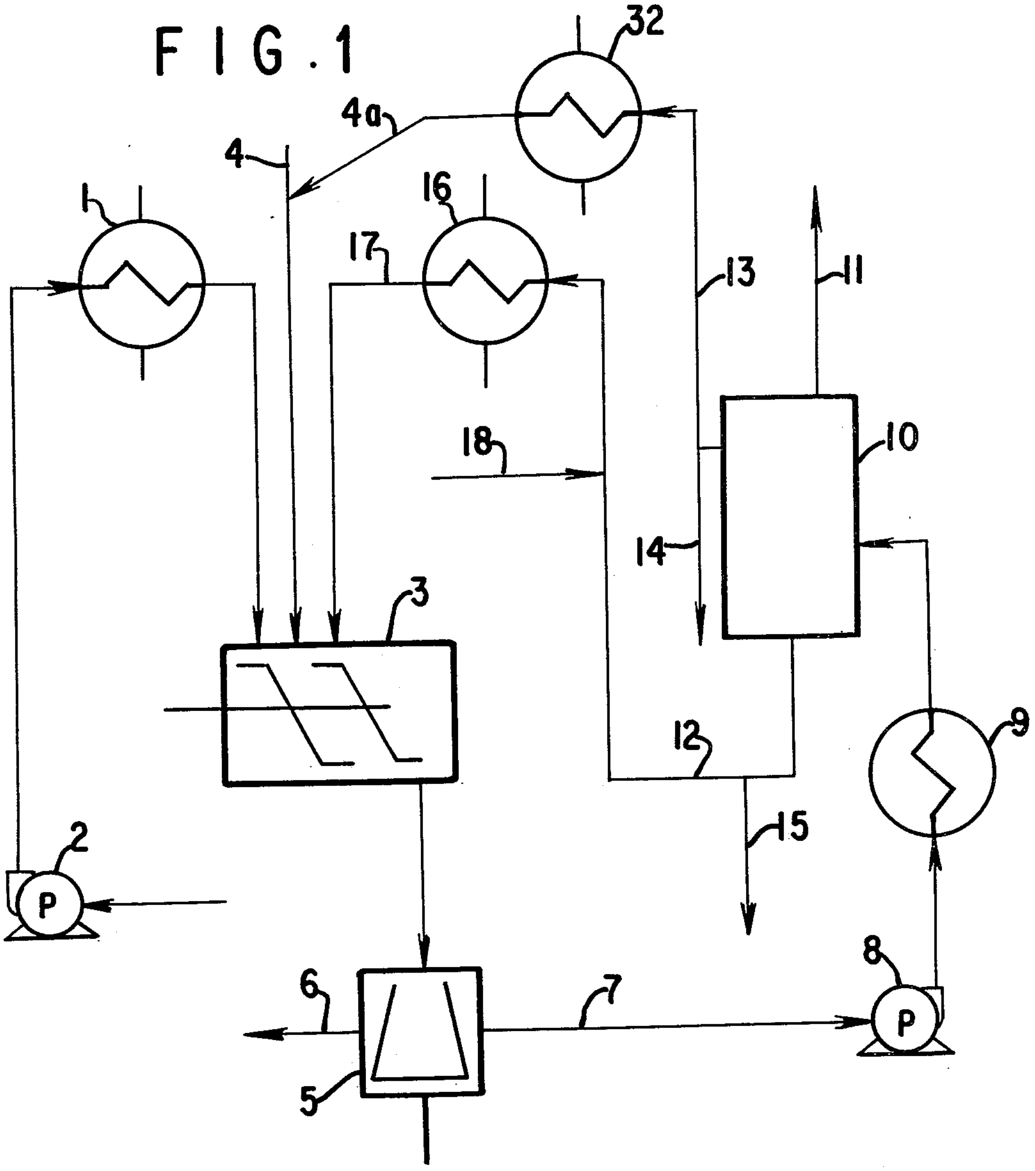
FIG. 1 shows an embodiment of the process of the invention.

The present invention relates to a process for the separation of mixtures of fatty substances by the hydrophilization, or "rewetting" process, wherein the solid substance suspension in an aqueous wetting agent solution is transformed into a three-phase system by heating said suspension to a temperature above the melting point of the fatty substances and up to 85° C, and separating the fatty substances from the three-phase system.

More particularly, the present invention is directed to an improvement in the method for separating mixtures of fatty substances into components with different melting points after the rewetting process which comprises the steps of (a) transforming said mixtures into a dispersion of separated liquid and solid particles of the fatty substances in aqueous solution which contain a wetting agent selected from the group consisting of alkyl sulfonates having 8 to 18 carbon atoms, fatty alcohol sulfates having 8 to 18 carbon atoms, sulfofatty acid methyl esters having 8 to 18 carbon atoms in the fatty acid moiety, sulfofatty acid ethyl esters having 8 to 18 carbon atoms in the fatty acid moiety, of monoglyceride sulfates of fatty acids having 8 to 18 carbon atoms, sulfated reaction products of fatty alcohols having 8 to 18 carbon atoms with 1 to 10 mols of ethylene oxide and/or propylene oxide, and the mixtures thereof, (b) separating said dispersion into two phases of different specific gravity, of which the lighter phase consists substantially of the liquid fatty substance portions and the heavier phase consists of a suspension of the solid fatty substance particles in an aqueous wetting agent solution, (c) separating said solid fatty substance portion from said aqueous wetting agent solution in said suspension, (d) removing and replacing at least a part of said aqueous wetting agent solution by a liquid selected from the group consisting of water and an aqueous solution containing a substance selected from the group consisting of a wetting agent, an electrolyte and mixtures thereof, (e) recycling the wetting agent portions that have not been removed from the process, and (f) recovering said components with different melting points; the improvement comprises heating said suspension of solid fatty substance particles in said aqueous wetting agent solution of (b) separated from said liquid fatty substance to a temperature between the melting point of said solid fatty substance up to about 85° C in a separation zone under ordinary or increased gravity to produce a three-phase system which consists of a molten fatty substance solid portion as the lightest phase, an intermediate aqueous phase of medium specific gravity with a high concentration of wetting agent, and a heavy aqueous phase with a low concentration of wetting agent and substantially separating said solid portion and said other two phases from each other.

Surprisingly, the above described problems are solved by the method according to the invention, which also has other advantages.

In order to simplify the nomenclature used herein, the mixtures of fats with different melting points to be separated is called a "starting mixture", the liquid phase obtained in the separation will be called "oil" and the solid phase will be called "solid portions", within the framework of the present patent application. The term "solid portions" will also be used for the higher melting fats if they are present in the liquid state under the prevailing conditions. The dispersion of separated solid and liquid fat particles in the aqueous wetting agent solution will be called "dispersion" for simplicity's sake, while the suspension of solid fat particles in the aqueous wetting agent solution issuing from the centrifuge is called "suspension".

The invention concerns an improved method for separating solid fatty mixtures into components with different melting points by transforming the fatty mixtures into a dispersion of separate liquid and solid particles of the fatty mixtures, in an aqueous wetting agent solution, which contains as wetting agents surface-active compounds, preferably anionic surface-active compounds. Examples of these anionic compounds include sulfonates and sulfates such as alkyl sulfonates having 8 to 18 carbon atoms, fatty alcohol sulfates having 8 to 18 carbon atoms, sulfofatty acid methyl esters and ethyl esters and having 8 to 18 carbon atoms in the fatty acid moiety, monoglyceride sulfates of fatty acids having 8 to 18 carbon atoms, sulfated reaction products of fatty alcohols having 8 to 18 carbon atoms with 1 to 10, preferably 2 to 5, mols of ethylene oxide and/or propylene oxide, and the mixtures thereof. Preferred wetting agents include sodium decylsulfate and a $C_{12}$ to $C_{16}$ olefin sulfonate. The longer chain alkyl radicals of the above mentioned wetting agents preferably have 10 to 18 carbon atoms. These surface-active compounds may be present in the form of their salts, such as the alkali metal salts, for example, the sodium salt or as the ammonium salt, or as a lower alkanol amine salt, for example, triethanol amine. This dispersion is separated into two phases of different specific gravity, of which the lighter phase consists substantially of the liquid fat portion and the heavier, a suspension of the solid fat particles in the aqueous wetting agent solution. The solid fat portions are isolated from the aqueous wetting agent solution, where at least a part of the aqueous wetting agent solution is removed and replaced by water or an aqueous solution containing wetting agents and/or electrolytes and where the unremoved wetting agent portions are recycled into the process.

The method according to the invention is characterized in that the fat suspension in an aqueous wetting agent solution, separated from the liquid fat portions, is transformed by heating to temperatures between the melting point of the solid portions and about 85° C by means of the usual separating devices at ordinary or increased gravity into a three-phase system which consists of molten solid particles as the lightest layer or phase, of an intermediate aqueous layer or phase of median specific gravity rich in wetting agents, and of a dense heavy aqueous layer or phase which is low in wetting agents, and the molten solid portions are then separated from the liquid phases which are then separated from each other.

By a "three-phase system" is meant a system which separates under the influence of gravity into three superimposed layers, each of different composition and different specific gravity, or which is already present as such.

The phase "ordinary or increased gravity" refers to the force generated upon matter at the ordinary acceleration of gravity due to the earth, and the force generated upon matter not only the the earth's gravity, but also any force generated by additional acceleration due to mechanical devices, such as centrifuges, respectively.

In general about 10% to 70% by weight of the entire aqueous solution is removed.

The invention is based on the unexpectedly surprising finding that fat suspensions in aqueous wetting agent solutions of the above-mentioned wetting agents do not separate into a two-phase system of molten solid portions and a homogeneous aqueous wetting agent solution, as assumed heretofore, when heated beyond the melting point of the solid portions. Instead of finding the above-mentioned and expected two phases, an unexpected third (intermediate) phase appears. This third phase is the intermediate layer which withdraws a considerable part of the respective wetting agent content from the fat phase and from the aqueous solution. The intermediate phase comprises up to about 25% by weight of the entire melted dispersion and absorbs up to 75% by weight of the total existing wetting agent. If the temperature is between the melting point of the solid fat portion and a temperature of about 15° C above it, which is most favorable for carrying out the method, the portion of the third or intermediate phase in the entire dispersion is at least 2% by weight, frequently it ranges from 2% to 20 % by weight. The wetting agent content of the intermediate phase is generally 10 to 100 times higher than the wetting agent content of the dense heavy bottom layer with the low wetting agent content. The total amount of the intermediate phase is generally between 1% and 10% by weight, but mostly between about 2% and 5% by weight, based upon the total weight of the three-phase system.

The third phase is formed at temperatures above the melting point of the solid portions. With rising temperature, the amount of the third phase diminishes and it disappears completely at temperatures above about 85° C.

Useful as separating devices are conventional devices for separating several liquid layers or phases according to their specific gravity. These are, for example, separator tanks, centrifuges, disk separators and hydrocyclones.

The method according to the invention has a number of important advantages. These will be described on the basis of a preferred embodiment of the invention.

Particularly preferred is a variant of the reaction method which is characterized in that the fat suspension in aqueous wetting agent solution is transformed by heating to temperatures between the melting point of the solid portions and up to about 85° C by means of conventional separators under ordinary or increased gravity into a three-phase system. This three-phase system is separated into three portions of different specific gravity, where one of the three portions consists of molten solid particles, while the other two portions are aqueous wetting agent solutions of different concentration. At least a part of at least one of the aqueous wetting agent solutions of different concentration is removed from the process and replaced by an aqueous solution containing wetting agents and/or electrolytes, with the remaining portions of the aqueous wetting agent solutions being recycled to the process. A greater percentage of the aqueous solution with the low concentration of wetting agent is removed than of the aqueous solution with the high concentration of wetting agent. The removed portions have therefore an average concentration which is lower than that of the portion recycled to the process. Preferably the wetting agent concentration of the removed portions is less than 80%, particularly less than about 60% of the average concentration of the entire aqueous portions. In general, only the solution with the low wetting agent concentration is removed.

Liquid mixtures are generally separated into three portions of different specific gravity by connecting two separators in series. This procedure can be utilized in the present invention, but principally the separation into three portions of different specific gravity can also be effected in a single apparatus. In general, however, two separators are arranged in series. There are two procedure embodiments for the order in which the separations can be effected:

Procedure A

In a first separator the fat is separated from the two aqueous phases, and in a second separator the aqueous solution is separated into two portions of different wetting agent concentration. In this embodiment of the method, it is necessary to work at both temperatures under conditions where two aqueous phases are present simultaneously. But working according to an embodiment, B, is preferred.

Procedure B

A part of the total aqueous solution is separated from the total mixture in a first separator, the remaining mixture of fat and an aqueous solution, which can have two phases, is separated in another separator into a fat phase and an aqueous solution. During the first separation, it is necessary to work under conditions where two aqueous phases exist simultaneously. Preferably the second separation is also effected in this temperature range. In Procedure B at least the first separation is carried out preferably by means of a separator tank.

For example, two separator tanks can be utilized in succession, with a portion of the heavy aqueous phase with the low concentration of wetting agent being withdrawn in the first separator tank and filtered out. Then a mixture of solid portions and of the aqueous phase with the high concentration of wetting agent, as well as the remaining aqueous phase with a low concentration of wetting agent, if any, is discharged from the first into the second separator tank. In the second separator tank, the remaining aqueous wetting agent solution is filtered out, and the light fat portion is also withdrawn as a process product.

Naturally the greatest possible difference in the average wetting agent concentration between the two aqueous portions is obtained in the separation into three portions which correspond exactly to the three phases.

If the separations which separate the aqueous solution into portions of different wetting agent concentration (of which one is present, if necessary, in the presence of the solid portions), were effected at temperatures above 85° C, an equalization of the concentrations would take place. After the separation into two aqueous portions of different wetting agent concentration, of which one is present in addition to the solid portions, no equalization of the concentrations could naturally take place anymore in the second apparatus, even at temperatures about 85° C.

The composition of the three phases can be determined analytically by titration of the wetting agent. To this end, a sample of the molten dispersion is simply taken and left standing in a separation funnel at the given temperature, after which the phases separate and can be withdrawn separately.

The advantages of the method according to the invention can readily be seen partly from the foregoing description of the preferred embodiments. For the first time it is possible, by carrying out the transformation process, to obtain the following result. That is in the separation of the solid portion, instead of having a single aqueous layer containing the wetting agent, there are two wetting agent solutions, one of which having an extremely low concentration of wetting agent, while the other has an extremely high concentration of wetting agent. It is thus possible for the first time to adjust over a wide range the concentration of wetting agent in the composition to be processed, during the further treatment of the aqueous portions thereof, by recycling and using the solution with the low concentration of wetting agent, or by recycling and using the solution with the high concentration of wetting agent, or by recycling and using a mixture of both solutions.

The separation of the aqueous portions according to the invention into a portion containing the higher concentration of wetting agent, and into a portion containing the lower concentration of wetting agent, is of considerable importance, particularly because of the resulting possible reduction in the wetting agent losses during the separation of the aqueous solution. Preferably, the aqueous phase with the low wetting agent content is therefore separated, and discarded if desired. It is thus possible to reduce the wetting agent losses by over 50%.

The separation of the aqueous portions according to the invention into two aqueous solutions of different wetting agent concentrations is also of great advantage in other respects. The rewetting method is preferably so carried out, as is known, that the mixture of oil and solid portions issuing from the scraper cooler is first stirred with a concentrated aqueous solution of wetting agent in a mixer. Then the rest of the existing aqueous solution is added in one of several mixing chambers as a solution with a lower concentration of wetting agent. This embodiment of the rewetting method is described in German Patent No. 970,292, and because of its great advantages it has become widely employed in practice. In a continuous operation of the rewetting method, it is not possible to select at random the wetting agent concentration in the first added concentrated portion of the entire aqueous solution. Rather the maximum attainable concentration in the first chamber of the mixer is necessitated by the fact that only so much wetting agent concentrate can be added as is necessary to compensate for the wetting agent losses of the process. Due to the separation of the aqueous solution into two solutions of different concentration according to the invention, it is possible for the first time to increase the concentration of the wetting agent entering into this first chamber. This solution is a more highly concentrated wetting agent solution than that concentration which formerly could be achieved by compensation for the wetting agent losses alone. To this end, it is advantageous to separate in a first separator, for example, a separator tank, a major part of the aqueous solution with the low concentration of wetting agent, a part of which is removed, while the remaining part is recycled into the process. In a second separator there are obtained, on the one hand, the molten solid fat portion and on the other hand, an aqueous wetting agent solution of high concentration. The highly concentrated aqueous wetting agent solution is used to increase the wetting agent concentration in those portions of the aqueous solution with which the mixture of oil and solid portions is first brought into contact. The amount of the wetting agent concentrate added is the amount necessary to compensate for the wetting agent losses during the process. Frequently it is of advantage to effect the first separation so that just enough of a highly concentrated wetting agent solution is obtained in the second separation as is necessary for us in the dispersion of the oil-solid mixture according to Ger. Pat. No. 970,292. The aqueous solution with a low concentration of wetting agent recycled into the process is then used to dilute the solution to the final concentration. The highly concentrated aqueous solution should comprise about 5% to 30% by weight of the total aqueous solution. If necessary, the highly concentrated aqueous solution is diluted with some low concentrated solution in order to adjust this to the desired concentration.

Finally, the separation according to the invention into a more concentrated and into a less concentrated aqueous wetting agent solution is of considerable advantage when the wetting agent solution is to be subjected to a purifying process. This is the case, for example, when the separation of a given starting mixture is completed. For the preparation of a wetting agent solution, a highly concentrated solution is of enormous advantage. The same holds true if the wetting agent solution is to be discarded after the completion of the continuous process with a given starting material, since the more concentrated solution can be discarded much more effectively.

A considerable advantage of the method according to the invention is finally that, when the solid portions are separated from a three-phase system, the solid portions are obtained in an extremely pure form with a low wetting agent concentration. While the solid portions obtained according to the conventional prior art method contain from about 0.2% to 0.6% by weight of wetting agent, it is possible with the method according to the invention to obtain solid fats which contain much lower amounts of a wetting agent, in general below 0.1% by weight, usually in the range of 0.06% to 0.08% by weight.

Examples of fat mixtures to be processed according to the invention include various fatty acid esters of vegetable, animal or synthetic origin having from 6 to 26 carbon atoms.

Examples of fatty acid esters of vegetable origin having 6 to 26 carbon atoms include coconut fat and palm kernel fat, palm oil, cottonseed oil, olive oil, soybean oil, peanut oil, linseed oil, rape oil or castor oil, etc. Fatty acid esters of animal origin having 6 to 26 carbon atoms include, for example, butter fat, chicken fat, or goose fat, lard, mutton tallow or beef tallow, kidney fats and bone fats, as well as the great number of various fish oils, train oils and whale oils, such as mehaden oil, herring oil or sperm oil, and cod-liver oils, etc. These fatty acid esters of natural origin occur most frequently as the triglycerides, and these are particularly suitable for the method of the invention. But the invention is not to be deemed limited to the separation of triglycerides. Thus for example, sperm oil can be used even though it contains, apart from the triglycerides, esters of the fatty acids with fatty alcohols. These fatty acid esters of other fatty alcohols can also be used as starting materials.

Apart from the naturally occurring triglycerides, processed products of natural fats, such as partially or completely hydrogenated fats, re-esterification products of natural fats or esterification products of fatty acids and alcohols, as well as, in general, derivatives of fatty acids and/or fatty alcohols of natural or synthetic origin can also be separated.

Furthermore, fatty acid mixtures can be used as starting materials to be processed according to the invention which are obtained, for example, by splitting or by saponifying or by ester exchanging the free fatty acids, from fatty acid esters, particularly from the fats found in nature. Of particular practical importance is the separation of the fatty acid mixtures obtained from the various tallow fatty acids into technical stearin and technical olein. But synthetically produced fatty acids can also be processed according to the invention.

The fat residues contained in the starting mixtures to be processed according to the invention in the form of esters, fatty acids or fatty alcohols contain preferably 6 to 26 carbon atoms, particularly 8 to 20 carbon atoms according to the invention. Compounds with branched-chain fat residues, as well as resinic acids or naphthenic acids, their esters and corresponding alcohols are also included in the category of "fats".

For the production of the dispersion of separated particles of solid portions and oil in an aqueous wetting agent solution, a pasty mixture of crystalline solid portions and oil is preferably used. The separating effect that can be achieved according to the invention depends in part on the quality of the crystals of the solid portion crystals. In order to obtain a good separation, it is advisable to melt the starting mixture completely and to cool it gradually to the temperature at which the separation is to take place. Scraper coolers have proved suitable for cooling the molten starting mixture. These are pipes with a cooling jacket whose inner surfaces are kept free of the crystallizing solid portions by revolving scrapers. Depending on the crystallization behavior of the starting mixture, the latter can leave the scraper cooler in a more or less supercooled state. It is therefore advisable to give the cooled starting mixture an opportunity, before it is processed, to crystallize out the higher melting components which have not yet been completely separated.

But the molten starting mixture can also be cooled to the separation temperature in a different way, for example, by mixing it with water or with an aqueous wetting agent solution and generating the low temperature by evaporating the water under reduced pressure. The precooled starting mixture, which has not yet attained the separation temperature, can also be cooled to this temperature in the scraper cooler or by bringing it into contact with a colder aqueous phase.

Frequently the wetting agent solution used to disperse the starting mixture cooled to the separating temperature has the same temperature as the mixture to be separated. The amount of wetting agent solution is about 0.5 to 3, preferably 1 to 2, parts by weight per part by weight of the mixture to be separated, as contained in the dispersion.

Preferably the wetting agents are used in such an amount that the dispersion contains 0.05 to 2, preferably 0.1 to 1 parts by weight of wetting agent per 100 parts by weight of solution before it enters the separating centrifuge. The above amounts of the wetting agent comprise not only the wetting agent actually dissolved in the aqueous phase, but also the wetting agent dissolved in oil or adsorbed on the surface of the solid portions.

The activity of the wetting agent solution is improved if it contains non-surface-active electrolytes which are inert to the starting mixture. These include, for example, the water-soluble chlorides, sulfates or nitrates of monovalent, divalent or trivalent metals, particularly the alkali metals, such as sodium, the alkaline earth metals, such as, magnesium or the earth metals. Additions of sodium sulfate or magnesium sulfate are particularly preferred. The concentration of electrolyte in the dispersion to be separated is in the range of 0.1% to 10%, preferably 1% to 5%, by weight. These percentages are calculated, as in the case of the wetting agent concentration, from the total amount of electrolytes contained in the dispersion, but are based upon the aqueous phase contained in the dispersion.

It is to be understood that the wetting agent solution is preferably an electrolytic wetting agent solution.

The wetting agent solution displaces the oil from the surface of the solid portions, regardless of whether the wetting agent solution is brought together with the starting mixtures cooled to the separating temperature or whether the liquid starting mixture is brought to the separating temperature together with the wetting agent solution, so that the solid portions are formed in the presence of the wetting agent solution. According to the above-mentioned German Patent No. 970,292, it is of particular advantage to mix the cooled starting mixture first only with a part of a correspondingly concentrated wetting agent solution and then to bring the more concentrated dispersion thus formed gradually to the desired end concentration by adding water, electrolytic solution or correspondingly diluted wetting agent solution. The cooled starting mixture is preferably dispersed first in 5% to 50%, particularly 10% to 30%, of the total wetting agent solution used, and then so much additional solution is added that the desired final concentration is obtained.

The dispersion is then separated into two phases of different specific gravity. Solid full jacket centrifuges have proved particularly to be preferable for this purpose which can be used in various embodiments, for example, as tube centrifuges, disk centrifuges or scaling centrifuges.

Of the layers or phases obtained, the lightest layer is the oil which consists substantially of the liquid components of the starting mixture, while the heavier layer represents a suspension of the solid portions in an aqueous wetting agent solution.

This suspension is an aqueous wetting agent solution is now heated to a temperature between the melting point of the solid portions and up to about 85° C. As mentioned above, three liquid layers or phases are formed, which are separated from each other in known manner as likewise mentioned above, into three portions of different specific gravity. The solid portions obtained can be washed with water, if necessary, to remove the last traces of wetting agents.

Frequently the method according to the invention is carried out in several stages by transforming one or both fractions obtained in the first separating stage into a dispersion of separate solid and liquid fat components of a corresponding higher or lower temperature, and separating it again. The method according to the invention can also be used with these subsequent stages.

A suitable apparatus for carrying out the separation method according to the invention is shown in FIG. 1. The molten starting mixture to be separated is fed to the cooling and crystallizing device 1 through the feed pump 2 and leaves the latter as a pasty mixture of oil and solid portions. This mixture arrived in the mixer 3, which consists preferably of several mixing chambers arranged in series, each of which is provided with a stirrer. In the first mixing chamber, the cooled starting material is stirred with the concentrated wetting agent solution arriving through the line 4 to form a dispersion.

In a preferred embodiment of the invention, the more concentrated of the two separated aqueous wetting agent solutions is returned into the process through lines 4a and 4. In the following mixing chambers, the less concentrated wetting agent solution and the electrolytic solution, respectively, are mixed in. The dispersion is formed in which the oil particles and the particles of the solid portions are dispersed in the wetting agent solution, separated from each other. Other mixing devices can also be used for transforming the pasty starting mixture into a dispersion in an aqueous wetting agent solution. Sometimes it suffices to subject the materials to be mixed with each other to a turbulent flow.

This dispersion is then separated by means of the solid jacket centrifuge 5 into the oil issuing at outlet pipe 6 as the lighter phase, and into the suspension issuing at outlet pipe 7 as the heavier phase.

According to the invention, this suspension is pumped by pump 8 and flows through the heater 9, where the suspension is heated until the solid portions melt. The wetting agent contained in the solid portions transfers over substantially into the intermediate phase. Molten solid portions and wetting agent solution then flow together into the separation system 10. Though the latter consists generally of two separators arranged in series, it is represented in FIG. 1 as a unit, from which the outlet pipe or line 11 (corresponding to the lighter fat phase), outlet pipe or line 12 (corresponding to the heavier aqueous portion with a low wetting agent concentration) and outlet pipe or line 13 (corresponding to the lighter aqueous portion with the higher wetting agent concentration), start. The fat portions are withdrawn over outlet pipe 11. If no separation of the entire aqueous solution into a more concentrated portion and into a less concentrated portion is effected, then pipes 13 and 14 can be omitted. The removal of aqueous solution can be effected through pipes 14 and 15, but generally it is only effected through pipe or line 15. The remaining parts of the aqueous solution are recycled into the process through pipes 13 and 12, respectively. The solution having a lower concentration of wetting agent is transferred through pipe 12, through a heat exchanger 16, through line 17, into the mixer. The more concentrated wetting agent solution is transported, however, by pipe 13 through the heat exchanger 32 to the pipes 4*a* and 4, through which the more concentrated wetting agent solution is fed into the mixer.

If in regard to the solutions carried by pipes 13 and 12, their quantitative ratio and concentration ratio, respectively do not correspond to the quantitative ratio and concentration ratio desired for pipe 4 and pipe 17; these solutions can be mixed in a suitable manner. Thus, there are crossover lines or pipes provided between pipes 4, 17, 13 and 12 which have not been indicated in FIG. 1 for simplicity sake.

The removal of wetting agent solution can be effected continuously or intermittently portionwise, as may be desired.

Water containing no wetting agent, or preferably an electrolyte solution containing no wetting agent can be added through the line 18. This addition can naturally be effected at another point.

Each of the two fat fractions obtained, the lower melting fraction (oil) and the higher melting fraction (solid portions) can be transformed into a dispersion of separated solid and liquid fat particles in an aqueous wetting agent solution. From the latter can then be obtained a lower melting and a higher melting fat fraction.

Figure 2:
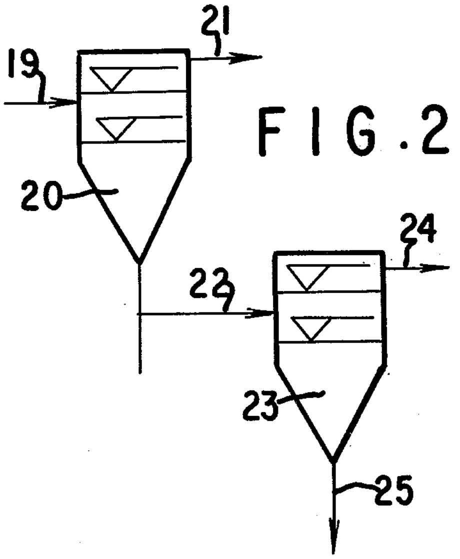
FIG. 2 shows an embodiment of the separation system 10 of FIG. 1.
Figure 3:
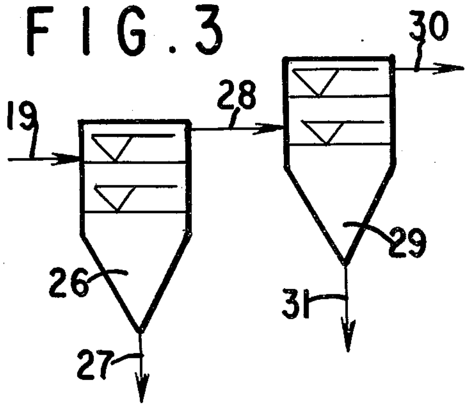
FIG. 3 shows an embodiment of the separation system 10 of FIG. 1.

The separation system 10, which is not shown in detail in FIG. 1, is represented in FIGS. 2 and 3 in two embodiments. These differ from each other by the type of linkage of the two separators. The molten suspension enters the separation system in both figures through feed line 19. In the embodiment of FIG. 2, however, the solid portions are withdrawn from the first separator 20 at outlet pipe 21 (corresponding to line 11 in FIG. 1), while the two liquid phases are transferred through the line 22 into the second separator 23, where the highly concentrated solution is withdrawn through outlet pipe 24 (corresponding to line 13 in FIG. 1) and the lower concentrated solution through outlet pipe 25 (corresponding to line 12 in FIG. 1).

In the preferred embodiment of FIG. 3, the low concentrated solution is withdrawn from first separator 26 through outlet pipe 27 (corresponding to pipe 12 in FIG. 1), while a mixture of solid portions and high concentrated solution is transported by pipe 28 into the second separator 29 from which the molten solid portions are withdrawn at outlet pipe 30 (corresponding to line 11 in FIG. 1) and the highly concentrated aqueous solution at outlet pipe 31 (corresponding to pipe 13 in FIG. 1).

EXAMPLES

The following examples are merely illustrative of the present invention without being deemed limitative in any manner thereof.

The apparatus used for the separation is shown in FIG. 1. In all examples, the starting fat mixture was first melted and then fed through the feed pump 2 to the scraper cooler 1. The fat mixture left the scraper cooler 1 as a pulp or slurry of oil and solid portions. The temperature to which it was cooled is the desired separation temperature, which depends on the nature of the fat mixture and which is specifically determined.

From the scraper cooler, the fat slurry flowed into the mixer 3, consisting of several mixing chambers arranged in series, each of which was provided with a stirrer. In the first mixing chamber, the cooled starting material was stirred with the "wetting agent concentrate" arriving from line 4 to form a dispersion. The "wetting agent concentrate" was produced by mixing electrolyte solution returned from the process with the amount of wetting agent necessary to compensate the occurring losses. The other mixing chambers served to dilute the mixture with wetting agent solution and electrolyte solution, respectively. These solutions had the same temperature as the slurry of oil and solid portions issuing from the scraper cooler. In the mixer 3 was formed the dispersion in which the oil particles and the solid portion particles were dispersed in the wetting agent solution separated from each other. The data contained in the examples concerning the concentrations of wetting agent and electrolyte also apply to this dispersion; they comprise the total amounts of wetting agent and/or electrolyte contained therein, but based upon the aqueous phase.

A solid jacket centrifuge separated the dispersion obtained into the lighter oil discharged through pipe 6 and into the heavy suspension discharged through pipe 7. The latter was transported through pump 8 and heater 9 into a "separation system" 10 and processed there as described in the various examples. By "separation system" is meant a combination of apparatus including all separating devices in a suitable arrangement. All devices are included for the functional connection of the individual units.

The liquid loss suffered by the withdrawal of wetting agent solution was compensated by the addition at pipe 18 of a fresh liquid phase containing no wetting agents; that is an electrolyte solution. But instead of using pipe 18, the addition of the electrolyte solution can also be effected through pipe 17 without passing through the heat exchanger 16.

All examples describe a continuous operation. As indicated specifically in the examples, the return of the wetting agent solution or solutions was effected through pipes 17 and 4, respectively, after the fats had been separated and removed from the aqueous phase.

EXAMPLE 1A

Processing of distilled tallow fatty acid (iodine number of 48.2)

0.85 tons/hour (t/h) of the tallow fatty acid were cooled in a scraper cooler 1 to 22° C. The pulp mixture of oil and solid portions was mixed first with 0.3 t/h of highly concentrated wetting agent solution and then with 1.1 t/h of dilute wetting agent solution, so that the dispersion discharged from the mixer had a wetting agent content of 0.31% by weight of sodium decylsulfate and an electrolyte content of 0.75% by weight of magnesium sulfate.

The dispersion was separated in known manner into an oily layer or phase, and into an aqueous layer or phase. The oily phase contained 0.44 t/h of technical olein (oleic acid).

The aqueous technical stearin suspension was heated to 60° C, and after melting, it was passed through a separator tank at a speed such that only a portion of the total amount of aqueous electrolyte solution "rained off". The system of FIG. 3 was used and the "rained off" solution was withdrawn at pipe 27. In this manner, 0.2 t/h of an aqueous electrolyte solution were discharged, which had a wetting agent concentration of 0.14% by weight. Consequently only 1.4 kg/t of wetting agent were lost by this procedure.

The mixture flowing over the separator tank was separated in a centrifuge into technical stearin (stearic acid) and a remaining aqueous wetting agent solution. The remaining aqueous solution had a total wetting agent concentration of about 0.31% by weight. The total aqueous solution was recycled through conduits 4 and 17. 0.41 t/h of technical stearin with an iodine number of 12.0 were obtained; and the wetting agent content of the stearin was 0.07% by weight.

The example shows that it is possible under the indicated conditions to separate the total existing wetting agent, electrolyte solution into portions of different wetting agent concentration.

From the cold stearin suspension issuing from the solid jacket centrifuge, a sample was taken, which was heated to 60° C, and kept thermostated at 60° C in a separation funnel. The system separated into three liquid phases; stearin, a dense aqueous phase with a low wetting agent content of 0.137% by weight, and an intermediate aqueous phase with a wetting agent content of 2.79% by weight. The intermediate phase represented about 5.8% by weight of the total existing aqueous solution.

EXAMPLE 1B

Utilizing a procedure analogous to that described in Example 1A above, except that the separator was bypassed; 0.2 t/h were removed from the aqueous solution. Stearin of the highest purity was likewise obtained. However, 2.9 kg/t of wetting agent were lost from the solution.

EXAMPLE 2A

Processing of distilled sunflower fatty acid (iodine number of 130).

50 kg/h of the molten starting mixture was cooled to 5° C. The mixture of oil and solid portions was mixed with 75 kg/h of highly concentrated wetting agent solution and then was mixed with 200 kg/h of dilute wetting agent solution. The wetting agent used was sodium decylsulfate, while the electrolyte used was magnesium sulfate. The wetting agent content of the dispersion issuing from the mixer was 0.29% by weight, and the electrolyte content was 1.0% by weight.

Based upon the separation into liquid fatty acid and solid portions, 40 kg of technical olein with an iodine number of 146.8 were obtained.

The solid portion dispersion issuing from the centrifuge 5 was heated to 60° C and then passed through a separator from which 229 kg/h of the aqueous solution were withdrawn, which had a wetting agent content of 0.12% by weight. From this aqueous solution, 15% by weight, based upon the total aqueous solution, were removed. The balance was recycled through conduit 17 into the process.

A sampling showed that the mixture issuing from the separator was composed of three phases: fatty acid solid portions, a concentrated aqueous solution having a wetting agent concentration of 2.09% by weight; and an aqueous layer with a low wetting agent concentration.

The mixture issuing from the separator tank was separated in a centrifuge into solid portions, on the one hand, and into an aqueous solution, on the other hand. 10 kg/h of fatty acid solid portions with an iodine number of 44.5 were obtained. 46 kg/h of the separated aqueous solution had a wetting agent concentration of about 1.1% by weight and was recycled through conduit 4 into the process. Wetting agent concentrate was added along with a small portion of the aqueous solution having a low concentration of wetting agent. 1.2 g of wetting agent per kg of solution were lost.

The wetting agent concentration in the fatty acid solid portions was 0.03% by weight.

EXAMPLE 2B

Using a procedure analogous to that described in Example 2A above, except that the separator tank was bypassed, and only the centrifuge was used for separating the fatty acid solid portions, 15% of the aqueous solution obtained was removed, and about 2.8 g/kg of the wetting agent were lost.

EXAMPLE 3

Processing of crude palm oil (acid number 5.6; saponification number 197.7; iodine number 51.4).

The crude palm oil was pumped from a storage tank serving at the same time as a cooler, in a cycle, through a scraper cooler back into the storage tank, so that the average residence time was 14 hours at 18° C. 32 kg/h of the mixture of oil and solid portions which was cooled to 18° C were mixed in the mixer with 60 kg/h of wetting agent solution at 18° C. The wetting agent solution contained a $C_{12}$ to $C_{16}$ olefin sulfonate having a concentration of 0.42% by weight, and an electrolyte concentration of 0.3% by weight of $CaCl_2$. The separation into liquid fatty and solid portion dispersion yielded 16 kg of liquid fatty material with an iodine number of 60.

The solid dispersion was melted by heating to 50° C and passed through a separation tank at such a speed that only about 10 kg/h (about 17%) of the total existing aqueous solution were separated. The separated aqueous solution had a wetting agent concentration of 0.07% by weight and was discarded. The wetting agent loss amounted to only 0.7 g/kg of wetting agent solution.

The mixture of remaining wetting agent solution and solid fat portions issuing from the separator tank was separated in a centrifuge. 16 kg of solid fat with an iodine number of 44.1 were obtained. The solid fat had an extremely low concentration of wetting agent, which could no longer be accurately determined by titration.

The wetting agent concentration of the aqueous solution separated in the centrifuge was about 0.48% by weight. After taking a sample of the mixture before it entered the centrifuge and permitting it to settle in the separator tank thermostatically maintained at 50° C, a sample of the intermediate layer was taken for analysis. The wetting agent concentration was 5.6% by weight.

EXAMPLE 4A

Processing of crude cleaved tallow fatty acids (iodine number 53).

60 kg/h of this starting material were cooled to 20° C. The mixture of oil and solid portions obtained was first mixed with 30 kg/h of concentrated wetting agent solution and then with 120 kg/h of dilute wetting agent solution. Sodium decylsulfate was used as the wetting agent, and the wetting agent concentration of the dispersion issuing from the mixer was 0.27% by weight; the electrolyte concentration was 1% by weight of magnesium sulfate. 33kg/h of technical olein were obtained in the usual manner. The stearin dispersion issuing from the centrifuge 5 was heated to 60° C, and then separated in a centrifuge into technical stearin (27 kg/h with an iodine number of 14.1 and a wetting agent content of 0.08% by weight) and into the entire aqueous solution. 20 kg/h of the entire aqueous solution were removed; the balance was recycled through pipe 18 into the process. The wetting agent loss was 2.5 g/kg of the removed wetting agent solution.

EXAMPLE 4B

The entire separated aqueous solution of Example 4A was transferred to a separator tank and 20 kg/h of the aqueous solution with a low wetting agent concentration were removed. The balance was recycled through conduits 4 and 17 into the process. The wetting agent loss was 1.5 g/kg of the removed wetting agent solution.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In the method for separating a mixture of solid and liquid fatty acids by the rewetting process which comprises the steps of (a) transforming said mixture into a dispersion of liquid fatty acid particles and solid fatty acid particles in an aqueous solution of a wetting agent selected from the group consisting of alkyl sulfonates having 8 to 18 carbon atoms, fatty alcohol sulfates having 8 to 18 carbon atoms, sulfofatty acid methyl esters having 8 to 18 carbon atoms in the fatty acid moiety, sulfofatty acid ethyl esters having 8 to 18 carbon atoms in the fatty acid moiety, monoglyceride sulfates of fatty acids having 8 to 18 carbon atoms, sulfated reaction products of fatty alcohols having 8 to 18 carbon atoms with 1 to 10 mols of ethylene oxide and/or propylene oxide, and mixtures thereof; (b) separating said dispersion into two phases of different specific gravity, of which the lighter phase consists substantially of the liquid fatty acid and the heavier phase consists substantially of a dispersion of the solid fatty acid in an aqueous wetting agent solution, (c) separating said solid fatty acid particles from said aqueous wetting agent solution in said suspension, (d) removing at least a part of said aqueous wetting agent solution and replacing the part removed by a liquid selected from the group consisting of water and an aqueous solution containing a substance selected from the group consisting of the aforementioned wetting agents, an electrolyte and mixtures thereof, (e) recycling to step (a) at least a portion of the wetting agent solution that has not been removed from the process, and (f) recovering said liquid and said solid fatty acids, the improvement which comprises heating said suspension of solid fatty acid particles in said aqueous wetting agent solution of (b) separated from said liquid fatty substance to a temperature between the melting point of said solid fatty substance up to about 85° C in a separation zone under ordinary or increased gravity to produce a three-phase system which consists of a molten fatty acid portion as the lightest phase, an intermediate aqueous phase of median specific gravity with a high concentration of wetting agent, and a heavy aqueous phase with a low concentration of wetting agent, and substantially separating said molten fatty acid portion and separating said other two phases from each other, and recycling at least part of said intermediate aqueous phase.

2. The method of claim 1, wherein at least a part of at least one of said aqueous wetting agent solutions of different concentration is removed from the process.

3. The method of claim 1, wherein said three-phase system is separated in a first separating zone into said heavy aqueous phase with a low concentration of wetting agent, and into a mixture of solid fatty acid and said intermediate aqueous phase with a high concentration of wetting agent; and wherein said mixture is separated in a second separating zone into said solid fatty substance and said intermediate aqueous phase.

4. The method of claim 1, wherein said three-phase system is separated in a first separating zone into said solid fatty acid and into a mixture of said intermediate aqueous phase with a high concentration of wetting agent and said heavy aqueous phase with a low concentration of wetting agent; and wherein said mixture is separated in a second separating zone into said intermediate aqueous phase and said heavy aqueous phase.

5. The method of claim 2, wherein a greater percentage is removed from the heavy aqueous phase with a low concentration of wetting agent than from the intermediate aqueous phase with a high concentration of wetting agent.

6. The method of claim 5, wherein only the heavy aqueous phase with a low concentration of wetting agent is removed.

7. The method of claim 5, wherein 10% to 70% by weight of both of said aqueous solutions are removed.

8. The method of claim 5, wherein said intermediate aqueous phase with a high concentration of wetting agent comprises about 5% to 30% by weight of the entire circulating solution.

9. The method of claim 8, wherein said starting mixture of fatty acids is first dispersed with said recycled solution after adding to sid recycled solution an amount of wetting agents necessary to compensate for the wetting agent losses, and then said recycled solution is diluted with the remaining recycled aqueous phase.

10. The method of claim 1, wherein said suspension of solid fatty acids of (b) is heated at a temperature between the melting point of said solid fat substance and 15° C above said melting point.

11. The method of claim 1, wherein said separation zone is a centrifugal separation zone.

12. The method of claim 1 wherein the suspension of solid fatty acid particles in said separation zone is maintained at a temperature between 50° C and 60° C until three phases have formed.

* * * * *